(12) United States Patent
Terrand et al.

(10) Patent No.: US 7,093,897 B2
(45) Date of Patent: Aug. 22, 2006

(54) AUTOMOBILE VEHICLE SEAT ADAPTABLE TO ACCOMMODATE A CHILD

(75) Inventors: Nicolas Terrand, Etampes (FR); Alain Laporte, Guyancourt (FR); Guillaume Huguet, Boulogne Billancourt (FR); Yves Heranney, Montbeliard (FR)

(73) Assignee: Faurecia Sieges D'Automobile, S.A., Nanterre (FR)

( * ) Notice: Subject to any disclaimer, the term of this patent is extended or adjusted under 35 U.S.C. 154(b) by 0 days.

(21) Appl. No.: 10/831,540

(22) Filed: Apr. 23, 2004

(65) Prior Publication Data
US 2005/0017556 A1 Jan. 27, 2005

(30) Foreign Application Priority Data
Apr. 23, 2003 (FR) ................................. 03 04944

(51) Int. Cl.
*A47C 7/14* (2006.01)
(52) U.S. Cl. ................................. 297/284.11
(58) Field of Classification Search ............ 297/284.11
See application file for complete search history.

(56) References Cited

U.S. PATENT DOCUMENTS

| | | | | |
|---|---|---|---|---|
| 3,632,166 A | * | 1/1972 | Lohr ........................ | 297/284.1 |
| 4,334,709 A | * | 6/1982 | Akiyama et al. ...... | 297/284.11 |
| 4,498,702 A | * | 2/1985 | Raftery ........................ | 297/312 |
| 4,693,513 A | * | 9/1987 | Heath ..................... | 297/284.11 |
| 4,709,949 A | * | 12/1987 | Umezawa et al. ............. | 292/6 |
| 4,709,961 A | * | 12/1987 | Hill ........................ | 297/284.11 |
| 4,717,203 A | * | 1/1988 | Meiller ................... | 297/284.11 |
| 4,767,155 A | * | 8/1988 | Kousaka et al. .... | 297/284.11 X |
| 4,915,447 A | * | 4/1990 | Shovar ................... | 297/284.11 |
| 5,380,063 A | * | 1/1995 | Dauphin ................. | 297/284.11 |
| 5,597,203 A | * | 1/1997 | Hubbard ................ | 297/284.11 |
| 5,647,635 A | * | 7/1997 | Aumond et al. ....... | 297/284.11 |
| 5,716,099 A | * | 2/1998 | McDiarmid ............ | 297/284.11 |
| 5,722,726 A | * | 3/1998 | Matsumiya ................. | 297/322 |
| 6,189,971 B1 | * | 2/2001 | Witzig .................... | 297/284.11 |
| 6,422,650 B1 | * | 7/2002 | Chien-Shen ................ | 297/312 |

(Continued)

FOREIGN PATENT DOCUMENTS

DE 44 12 617 10/1994

(Continued)

OTHER PUBLICATIONS

French Preliminary Search Report dated Nov. 28, 2003 for French Application No. 0302944.

*Primary Examiner*—Rodney B. White
*Assistant Examiner*—Stephen D'Adamo
(74) *Attorney, Agent, or Firm*—Stephen Bongini; Fleit, Kain, Gibbons, Gutman, Bongini & Bianco P.L.

(57) ABSTRACT

A seat for an automobile vehicle comprises a seat pan (2) and a seat back (3), the seat pan (2) featuring a seating surface that is approximately horizontal extending from the seat back (3) to a forward limit (43), the seating surface comprising a fixed seating surface (4) and a mobile front section (5) spanning at least part of the width of the forward limit (43). The front section (5) can move between a raised position in which it is aligned with the fixed seating surface (4), and a tilted position in which the front section (5) is tilted down below the fixed seating surface (4) forming ridge (44) with it that is more or less parallel with the forward limit (43), this position being suitable to accommodate a seated child.

14 Claims, 4 Drawing Sheets

U.S. PATENT DOCUMENTS 6,499,802 B1 * 12/2002 Drira ..................... 297/284.11
6,811,219 B1 * 11/2004 Hudswell et al. ........... 297/312
6,921,133 B1 * 7/2005 Taoka et al. ........ 297/284.11 X

FOREIGN PATENT DOCUMENTS

| | | | | |
|---|---|---|---|---|
| DE | 201 02 329 | 6/2002 | | |
| DE | 101 27 568 | 12/2002 | | |
| DE | 101 27 569 | 12/2002 | | |
| EP | 0 666 194 | 8/1995 | | |
| JP | 61160325 A | * 7/1986 | ............ | 297/284.11 |
| JP | 05220025 A | * 8/1993 | | |
| JP | 10 016617 | 1/1998 | | |
| WO | WO 9317604 A1 | * 9/1993 | | |

* cited by examiner

AUTOMOBILE VEHICLE SEAT ADAPTABLE TO ACCOMMODATE A CHILD

FIELD OF THE INVENTION

The invention concerns an automobile vehicle seat that can be adapted to accommodate a child.

BACKGROUND OF THE INVENTION

When a child becomes too big to sit in an infant's car seat installed in a vehicle, the child is placed directly in a seat. Vehicle seats, however, are generally designed for adults. Consequently, the seating surface is often too long for only the child's thighs to rest on the seat when the child's back is braced against the seat back. The seat pan extends partially beneath the child's legs and the feet are not supported. This position is obviously uncomfortable for the child.

Document DE 44 12 617 describes a seat in which a front section of the seat pan pivots downward. The fixed part of the seat pan is thus sufficiently short for the child to be able to bend his/her knees. The child's feet are then in contact with a surface of the mobile part of the seat pan. When the mobile part is in the raised position, the seat pan supports the thighs of an adult in the normal fashion.

However, when the mobile part pivots, it occupies a space that extends beyond that normally occupied by the seat, and is exposed to bumps, particularly from the occupant's feet.

SUMMARY OF THE INVENTION

The invention aims at providing a seat that can be adapted for children and does not take up more space when in the child seating position.

With this objective in mind, the subject of the invention is an automobile vehicle seat with a seat pan and seat back, the seat pan featuring a roughly horizontal seating surface extending forward from the seat back to a forward limit, and comprising a fixed seating surface and a mobile front section that spans at least a portion of the forward limit of the seat pan. According to the invention, the front section can move between a raised position in which it is aligned with the seating surface, and a tilted position in which the front section is titled down below the fixed seating surface, forming with it a ridge that is more or less parallel with the forward limit.

When the front section is in the raised position, the seating surface formed by the alignment of the fixed seating surface with the mobile front section is suitable to accommodate an adult. When the mobile section is in the tilted position however, the horizontal part of the seating surface is shortened to a length suitable for supporting the thighs of a child. The mobile front section forms an angle with the fixed seating surface that allows the child to bend his/her knees while at the same time supporting the calves. The child's comfort is thus improved, while the comfort of an adult using the seat in the normal position is unaffected.

Furthermore, the movement of the front section is only directed downwards. Thus when the front section is moved from the raised position to the tilted position, the seat does not occupy any additional space.

Preferentially, the seat pan comprises a frame, a panel mounted to pivot on the frame around a transverse axis, with the front section being connected to the panel. Pivoting of the panel brings the front section from the raised position to the tilted position, forming an angle between the mobile front section and the fixed seating surface.

Also preferentially, the frame comprises a panel support mounted on the frame and on which the panel is hinged. The seat design is thus modular, such that the same frame can be used to manufacture either a normal seat or a seat featuring the mobile front section in accordance with the invention, by adding the panel support incorporating the panel. Moreover, the panel support, the panel and the mobile section assembly can be prepared separately from the seat and added to the seat pan in a just-in-time assembly process.

In a particular manner, the frame supports padding on which the seating area is situated, with a front cushion covering the panel and on which the mobile front section is situated, thereby facilitating movement of the panel.

In another particular manner, the frame supports a padding on which the seating area is situated, with the padding extending over the panel from the ridge between the fixed seating surface and the mobile front section. Thus the seating surface appears continuous at the ridge between the fixed surface and the front section.

The seat comprises return means that tend to maintain the panel in the raised position, and locking means to lock the panel in the tilted position. Thus the raised position is the normal position, and the tilted position is reached by pushing down on the panel to counter the return means. The action to be performed by the user is relatively easy. Furthermore, there is no need to provide a mechanism to lock the panel in the raised position, which should be able to support the weight of an adult sitting forward on the front section. Once the panel has been pushed down to the tilted position, the locking means block it in that position.

Preferably the locking means lock the panel automatically when the fully tilted position is reached and release the panel when it is pressed downwards again when in the tilted position. Thus, no particular manoeuvre is required to lock or release the panel.

To improve the aesthetics, the seat comprises a curtain linking the front section to the seat pan frame. Thus the space below the panel is closed off, even when the panel is in the raised position.

Preferably, elastic means are provided to pull the curtain underneath the seat pan towards the back of the seat. Thus, when the panel is placed in the tilted-down position, the curtain is pulled rearwards beneath the panel, into a space out of the vehicle occupants' sight.

In a first embodiment, the front section spans across a central section of the width of the seat pan.

In a second embodiment, the front section spans across the entire width of the seat pan.

BRIEF DESCRIPTION OF THE DRAWING

The invention will be more clearly understood and other particular features and advantages will appear through reading the following description, which makes reference to the appended drawings in which.

DETAILED DESCRIPTION OF PREFERRED EMBODIMENTS

Figure 1:
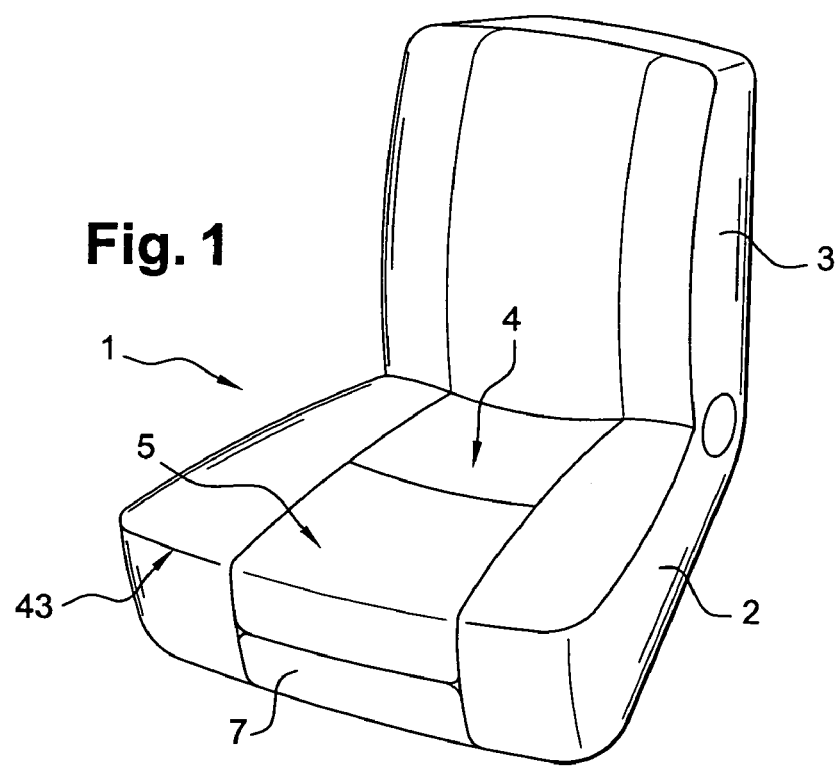
FIG. 1 is a perspective view of a seat in compliance with a first embodiment of the invention, with the mobile-front section in the raised position.
Figure 2:
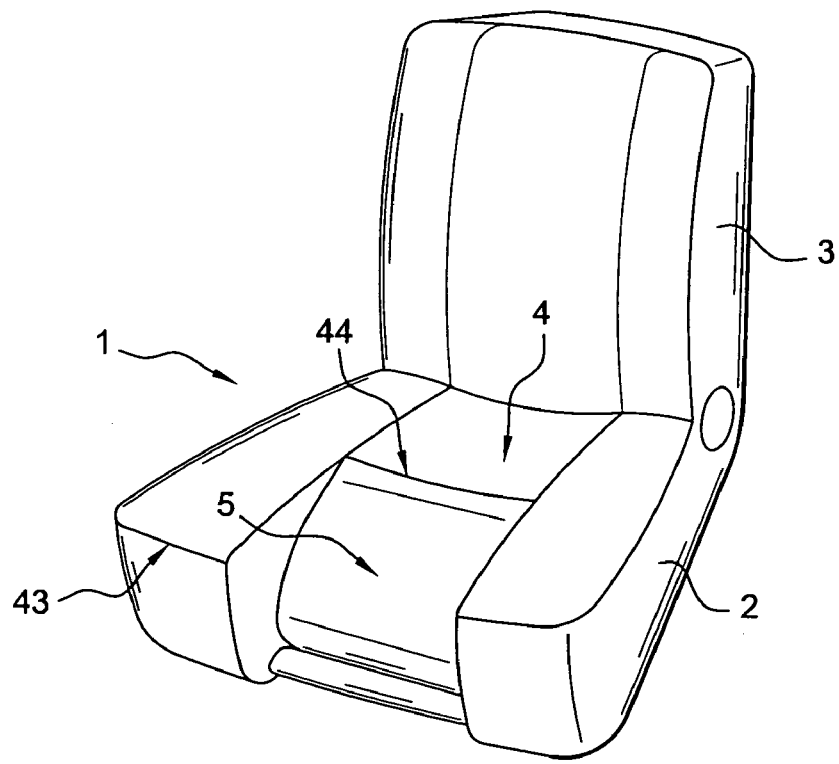
FIG. 2 is a view similar to FIG. 1, with the mobile front section in the tilted position.

A seat 1 in compliance with a first embodiment of the invention is shown in FIGS. 1 to 4. The seat 1 comprises an approximately vertical seat back 3, and a seat pan 2 of which the seating surface is approximately horizontal. The seating surface extends forward from the seat back to the forward limit 43. The area near this forward limit 43 is also called the front of the seat. The seating surface comprises a fixed surface 4 and a front section 5 extending from a central portion of the forward limit 43 towards the rear of the seating surface.

Figure 3:
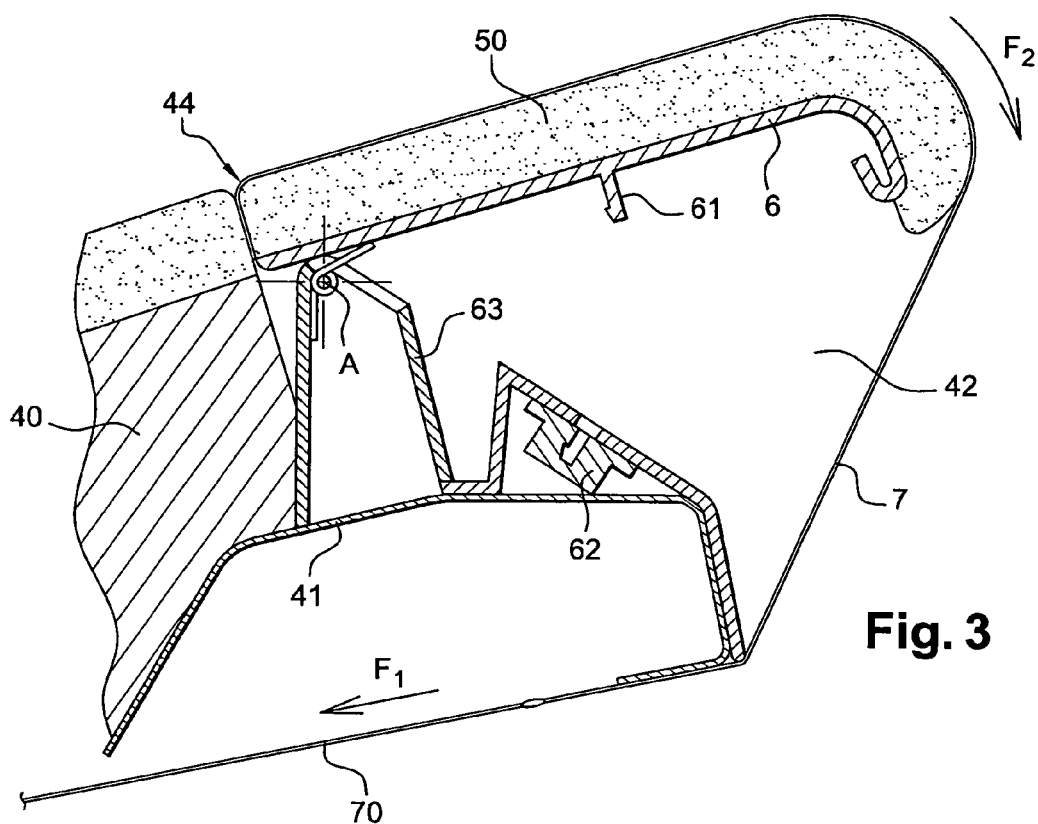
FIG. 3 is a partial cross-section of the seat shown in FIG. 1, with the mobile front section in the raised position.
Figure 4:
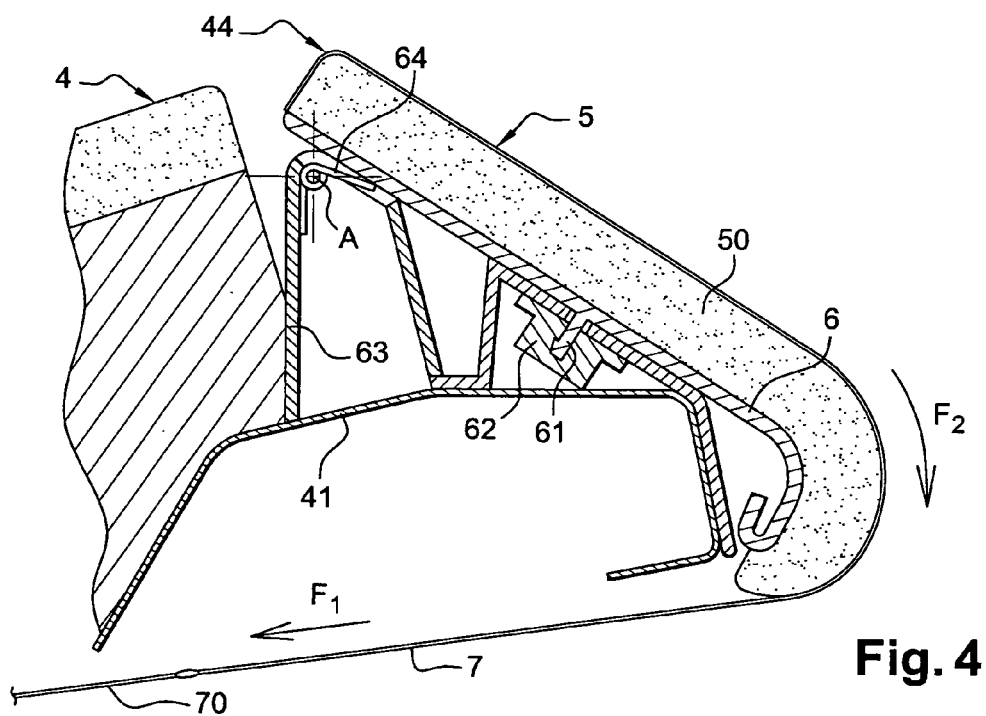
FIG. 4 is a view similar to FIG. 3 with the mobile front section in the tilted position.

As it can be seen more specifically in FIGS. 3 and 4, the seat pan comprises a frame 41 on which is placed a padding 40. The fixed seating surface 4 is supported by this padding 40. A panel 6 is placed beneath the mobile front section 5. A panel support 63 is secured to the seat pan frame 41 and the panel 6 is mounted so that it pivots around an axis A on the panel support 63. The panel 6 is covered by a front cushion 50 whose surface on the side opposite the surface in contact with the panel forms the front section 5. A torsional spring 64 is provided to push the panel 6 towards a stopped raised position in which the front section 5 and the fixed seating surface 4 are approximately aligned. Panel 6 is normally maintained in the raised position by spring 64 as shown in FIG. 3.

The seat pan 2 comprises locking means that comprise a latch 62 and a locking finger 61. The latch 62 is fixed to the panel support 63, while the locking finger 61 is fixed to the panel 6. The locking finger 61 is intended to work jointly with the latch 62 in a way that is detailed further on. An example of a latch that can be used in this invention can be found in document U.S. Pat. No. 4,709,949.

A flexible curtain 7 extends from the forward limit 43 towards the underside of the frame 41. A space 42 under the panel 6 thus delimited is hidden by the curtain 7. Elastic means 70 pull the curtain in the direction of the arrow F1.

When one wants to place a child in the seat conforming to the invention, one applies pressure to panel 6, preferably near the forward limit 43, to make the panel pivot in the direction of arrow F2. Panel 6 thus reaches the tilted position illustrated in FIG. 4. At this moment, the locking finger 61 enters the latch 62 and locks there, holding panel 6 in the tilted position. When the front section 5 is in this position, a child can easily sit in the seat with his/her thighs resting on the fixed seating surface 4 while the calves rest on the front section 5. The child's knees are situated near the ridge 44 separating the mobile front section from the fixed seating surface 4.

When the panel 6 moves from the raised position to the tilted position, the elastic means 70 pull the curtain 7 beneath the seating frame 41. The curtain 7 is thus held constantly taut and no part of it hangs down in a visible area.

When the seat is to be returned to the raised position to accommodate an adult, pressing the panel 6 down again in the direction of the arrow F2 causes the latch 62 to release the locking finger 61 thereby unlocking the panel. When the pressure on the panel is released, it is returned to the raised position by the spring 64. The seat can then be used by an adult, whose thighs will rest on both the fixed seating surface 4 and the front section 5. It goes without saying that spring 64 delivers sufficient upward thrust to withstand the pressure of the adult passenger's thighs on the front section 5.

It is perfectly possible to envisage using a latch that is released by actuating a device such as a button, a handle or a strap, instead of the latch indicated in the figures.

Figure 5:
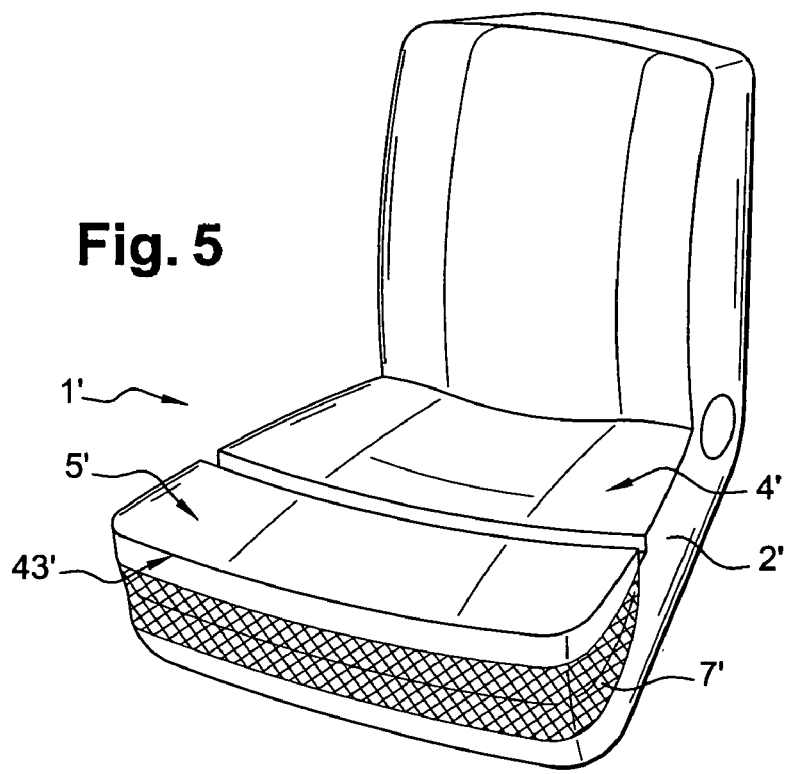
FIG. 5 is a perspective view of a seat in compliance with a second embodiment, with the mobile front section in the raised position.
Figure 6:
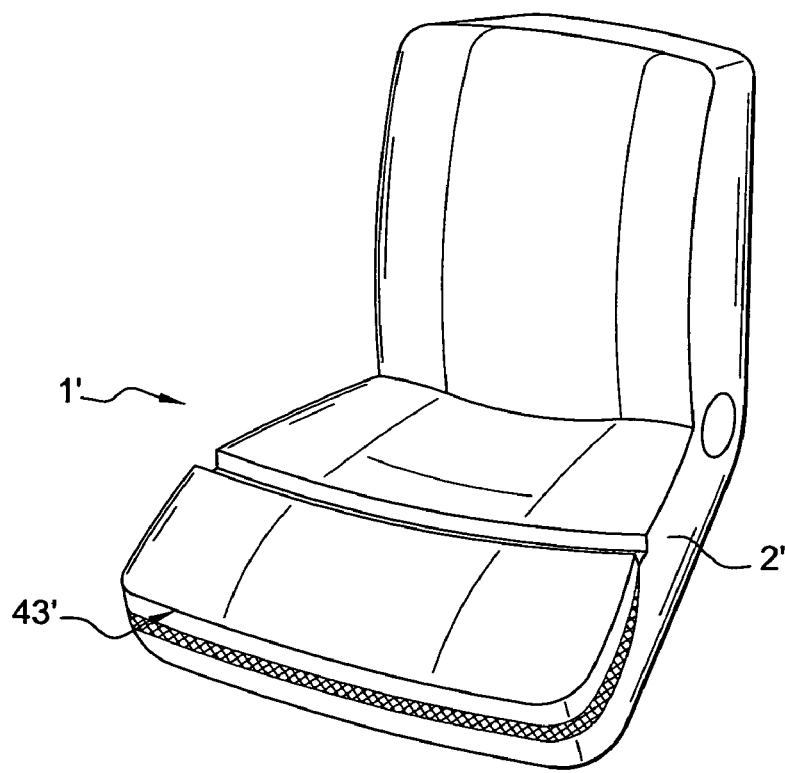
FIG. 6 is a similar view to FIG. 5, with the mobile front section in the tilted position.
Figure 7:
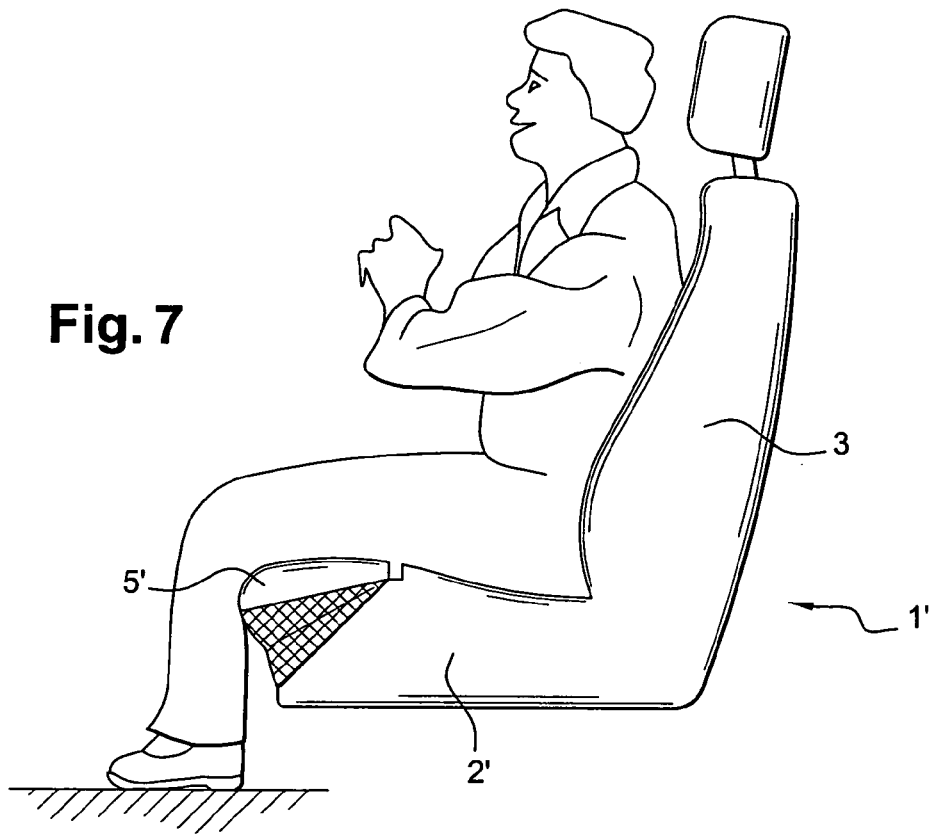
FIG. 7 is a side view of the seat shown in FIG. 6, in the raised position.

FIGS. 5 to 7 show a second embodiment of the invention. A seat 1' also comprises a fixed seating surface 4' and a mobile front section 5'. The front section 5' spans the entire width of the seat pan 2'. The front section 5' is supported by a mechanism similar to that used in the first embodiment, but in this case the panel extends across the entire width of the seat. With this embodiment, a curtain 7' is stretched under the panel around the edge of the seating surface. This curtain 7' is preferably made of an elastic material, such that it remains stretched irrespective of whether the front section 5' is in the raised or tilted position.

Figure 8:
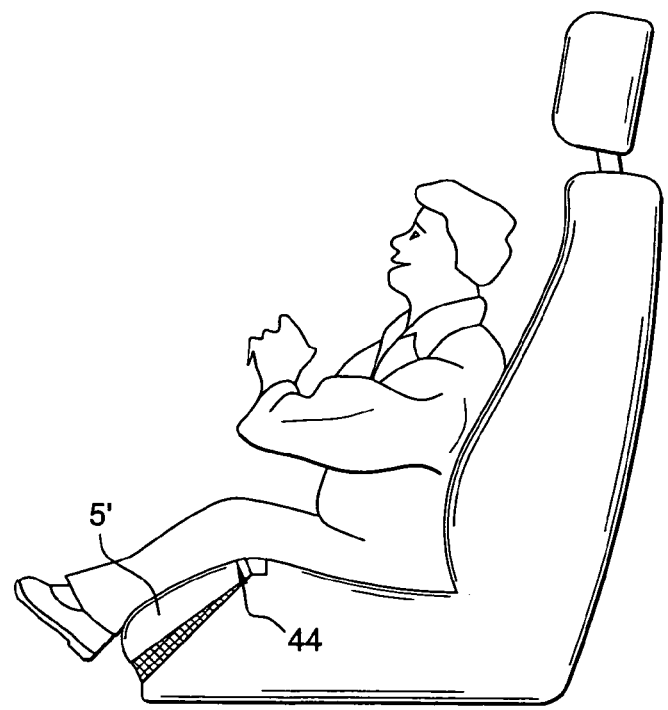
FIG. 8 is a side view of the seat shown in FIG. 6, in the tilted position.

FIG. 7 shows an adult occupying the seat 1' forming the subject of the invention when the front section 5' is in the raised position. FIG. 8 shows a child occupying the same seat 1' when the front section 5' is in the tilted position. In this case the child's calves rest on the front section 5'.

The invention is not limited to the embodiments, described above by way of example. The front section cushion could be an extension of the fixed seating surface padding. The panel hinging mechanism could provide for locking in intermediate positions between the raised position and the tilted position. It could alternatively provide a hard spot such that the panel offers greater resistance to leaving the raised position, or even several hard spots with stable intermediate positions between the raised position and the tilted position. The latch can be situated beneath the panel, operating with a catch fixed on the panel support.

What is claimed is:

1. A seat for an automobile vehicle, the seat comprising:
a seat back; and
a seat pan comprising an approximately horizontal seating surface extending forward from the seat back to a forward limit,
wherein the seating surface comprises a fixed seating surface and a mobile front section that spans at least a portion of the forward limit,
the front section can move between a raised position in which it is aligned with the fixed seating surface, and a tilted position in which the front section is tilted down below the fixed seating surface so as to form a ridge with the fixed seating surface that is substantially parallel with the forward limit,
the seat pan further comprises a frame, a separately formed panel support mounted on the frame, and a panel mounted so as to pivot around a transverse axis on the panel support,
the front section is connected to the panel,
the panel is hinged on the panel support, and
the seat further comprises;
return means that tend to maintain the panel in the raised position; and
locking means to lock the panel in the tilted position, said locking means of the seat automatically locking the panel in the tilted position when that position is reached, and releasing the panel when downward pressure is again applied to the tilted panel.

2. The seat in accordance with claim 1,
wherein the frame supports a padding on which the fixed seating surface is situated, and a front section cushion covers the panel, the mobile front section being situated on the front section cushion.

3. The seat in accordance with claim 1, further comprising a curtain linking the front section to the frame of the seat pan.

4. The seat in accordance with claim 1 wherein the front section spans the full width of the seat pan.

5. The seat in accordance with claim 1, wherein the front section spans a central section of the forward limit.

6. The seat in accordance with claim 1, wherein the front section spans a central section of the forward limit but does not span the full width of the seat pan.

7. The seat in accordance with claim 1, further comprising a hinging mechanism that hinges the panel on the panel support.

8. The seat in accordance with claim 1, further comprising a torsional spring that normally maintains the panel in the raised position.

9. The seat in accordance with claim 8, wherein the spring delivers sufficient upward thrust to be able to support the weight of an adult's thighs on the front section.

10. An automobile including at least one seat, the seat comprising:
    a seat back; and
    a seat pan comprising an approximately horizontal seating surface extending forward from the seat back to a forward limit,
    wherein the seating surface comprises a fixed seating surface and a mobile front section that spans at least a portion of the forward limit,
    the front section can move between a raised position in which it is aligned with the fixed seating surface, and a tilted position in which the front section is tilted down below the fixed seating surface so as to form a ridge with the fixed seating surface that is substantially parallel with the forward limit,
    the seat pan further comprises a frame, a separately formed panel support mounted on the frame, and a panel mounted so as to pivot around a transverse axis on the panel support,
    the front section is connected to the panel,
    the panel is hinged on the panel support, and
    the seat further comprises:
        return means that tend to maintain the panel in the raised position; and
        locking means to lock the panel in the tilted position, said locking means of the seat automatically locking the panel in the tilted position when that position is reached, and releasing the panel when downward pressure is again applied to the tilted panel.

11. The automobile in accordance with claim 10,
    wherein the frame of the seat pan of the seat supports a padding on which the fixed seating surface is situated, and
    a front section cushion covers the panel, the mobile front section being situated on the front section cushion.

12. The automobile in accordance with claim 10, wherein the seat further comprises a curtain linking the front section to the frame of the seat pan.

13. The automobile in accordance with claim 10, wherein the front section of the seat spans the full width of the seat pan.

14. The automobile in accordance with claim 10, wherein the front section of the seat spans a central section of the forward limit but does not span the full width of the seat pan.

* * * * *